(12) United States Patent
Chen et al.

(10) Patent No.: US 12,497,881 B2
(45) Date of Patent: Dec. 16, 2025

(54) ACID STIMULATION OF CARBONATE FORMATION WITH CARBON DIOXIDE-RESPONSIVE DIVERTING AGENT

(71) Applicant: Saudi Arabian Oil Company, Dhahran (SA)

(72) Inventors: Shaohua Chen, Beijing (CN); Limin Xu, Beijing (CN); Bader G. AlHarbi, Dammam (SA); Sharefah A. Alsultan, Dhahran (SA); Tianping Huang, Beijing (CN)

(73) Assignee: Saudi Arabian Oil Company, Dhahran (SA)

( * ) Notice: Subject to any disclaimer, the term of this patent is extended or adjusted under 35 U.S.C. 154(b) by 0 days.

(21) Appl. No.: 18/629,388

(22) Filed: Apr. 8, 2024

(65) Prior Publication Data

US 2025/0314165 A1  Oct. 9, 2025

(51) Int. Cl.
*E21B 43/27* (2006.01)
*C09K 8/60* (2006.01)
(Continued)

(52) U.S. Cl.
CPC .............. *E21B 43/27* (2020.05); *C09K 8/602* (2013.01); *C09K 8/74* (2013.01); *E21B 43/2605* (2020.05)

(58) Field of Classification Search
None
See application file for complete search history.

(56) References Cited

U.S. PATENT DOCUMENTS

| 10,584,276 B2 | 3/2020 | Dai et al. |
| 11,814,583 B2 | 11/2023 | Chang et al. |

(Continued)

FOREIGN PATENT DOCUMENTS

| CA | 2820910 | 11/2018 |
| CN | 106010496 | 10/2016 |

(Continued)

OTHER PUBLICATIONS

Yang et al., "New Method Based on CO2-Switchable Wormlike Micelles for Controlling CO2 Breakthrough in a Tight Fractured Oil Reservoir," Energy & Fuels, 2019, 33:4806-4815, 10 pages.

(Continued)

*Primary Examiner* — Andrew Sue-Ako
(74) *Attorney, Agent, or Firm* — Fish & Richardson P.C.

(57) ABSTRACT

A method of acid stimulation that includes: injecting a first acid into a subterranean carbonate formation, the first acid dissolving a first portion of a carbonate material in the subterranean carbonate formation to form a first group of channels in a first zone within the subterranean carbonate formation while generating carbon dioxide ($CO_2$); injecting a diverting agent into the first group of channels, the injected diverting agent reacting with the $CO_2$ and forming a gel to seal the first group of channels; and injecting a second acid into the subterranean carbonate formation, the second acid dissolving a second portion of the carbonate material in the subterranean carbonate formation to form a second group of channels in a second zone within the subterranean carbonate formation, the second zone having a permeability lower than the first zone, the gel blocking the second acid from entering the first group of channels.

19 Claims, 9 Drawing Sheets

(51) Int. Cl.
  *C09K 8/74* (2006.01)
  *E21B 43/26* (2006.01)

(56) References Cited

U.S. PATENT DOCUMENTS

| | | | |
|---|---|---|---|
| 11,993,747 B1* | 5/2024 | Al-Yousif | C09K 8/594 |
| 2018/0119003 A1* | 5/2018 | Eluru | C09K 8/575 |
| 2020/0071601 A1 | 3/2020 | Long et al. | |

FOREIGN PATENT DOCUMENTS

| | | |
|---|---|---|
| CN | 108384528 | 7/2020 |
| CN | 107142099 | 9/2020 |

OTHER PUBLICATIONS

Su et al., "Switchable viscosity triggered by CO2 using smart worm-like micelles," Chemical Communications, Feb. 13, 2013, 49:2655-2657, 3 pages.

* cited by examiner

ACID STIMULATION OF CARBONATE FORMATION WITH CARBON DIOXIDE-RESPONSIVE DIVERTING AGENT

TECHNICAL FIELD

This disclosure relates to methods of acid stimulation of a carbonate formation using a carbon dioxide ($CO_2$)-responsive diverting agent.

BACKGROUND

Recoverable fluids, e.g., hydrocarbons such as petroleum or natural gas, and water, are frequently found in subterranean formations. Production of a recoverable fluid from a subterranean formation often requires drilling onto the subterranean formation to produce a wellbore through which the recoverable fluid is brought to the surface. To optimize the wellbore productivity, a stimulation treatment is sometimes necessary. For example, a carbonate formation can be stimulated using an acid treatment.

SUMMARY

This disclosure describes technologies relating to methods of acid stimulation of a subterranean carbonate formation using a $CO_2$-responsive diverting agent.

BRIEF DESCRIPTION OF DRAWINGS

FIGS. 3A-3D are a subterranean carbonate formation at various steps of the acid stimulation with a $CO_2$-responsive diverting agent, wherein

FIGS. 6A-6C are example process flow diagrams of a method of acid stimulation using a $CO_2$-responsive diverting agent, where

FIGS. 7A-7B are photographs of a solution of a $CO_2$-responsive diverting agent, where

DETAILED DESCRIPTION

Implementations described herein provide methods of acid stimulation of a carbonate formation using a carbon dioxide ($CO_2$)-responsive diverting agent. In various implementations, the $CO_2$-responsive diverting agent is a low-viscosity solution containing an anionic surfactant (e.g., sodium dodecyl sulfate) and an amine additive (e.g., diethylenetriamine), where the low-viscosity solution can be converted to a high-viscosity gel upon reacting with in-situ $CO_2$ formed within flow channels. This gel can block the initially formed flow channels and allows subsequent acid injection steps to create new flow channels in less permeable zones in the carbonate formation.

Generally, in acid stimulation, the flow channels, e.g., fractures and wormholes, resulting from the well stimulation and protruding into the subterranean formation increase its permeability to the recoverable fluid and enhance productivity of the wellbore. However, a successful stimulation treatment requires an even distribution of the multiple hydraulic fractures or acid-treated wormholes along the targeted segment of the wellbore. This is challenging especially when the stimulated subterranean formation segment is long or heterogeneous, which is often the case for long horizontal wells and multi-layered reservoirs.

An even stimulation of the desired area can be achieved by the injection of diverting agents into the subterranean formation. Diverting agents are used to block dominant flow channels and divert the stimulation fluid to create additional smaller flow channels or to propagate new fractures and wormholes in the desired area. Generally, both mechanical and chemical diverting agents can be used. Mechanical diverting agents, such as ball sealers, could be effective, but their use is limited by high costs associated with additional equipment that is necessary to carry out the treatment, such as tractors, vibrators, and packers. Chemical diverting agents, such as foams, viscous fluids, gels, particulates of various sizes, fibers, or mixtures of the foregoing, can be injected downhole to create flow resistance and reduce fluid mobility inside the dominant channels. However, the use of existing chemical diverting agents is limited due to insufficient sealing performance and the lack of mechanistic insights. Therefore, new compositions for a chemical diverting agent that can be effectively applied in acid stimulation may be desired.

In various implementations, the $CO_2$-responsive diverting agent described in this disclosure can improve the channel pattern and thereby volumetric sweeping efficiency during the acid stimulation by converting the diverting agent into a non-flowable, high-viscosity gel that seals the channels. The methods of acid stimulation can follow the steps of (1) injecting an acid, e.g., hydrochloric acid (HCl), into the carbonate formation in gas and oil reservoirs to increase the permeability and porosity, while generating $CO_2$ as a by-product; (2) injecting the $CO_2$-responsive diverting agent into the flow channels created by the step (1) to form the high-viscosity gel through the reaction of the injected $CO_2$-responsive diverting agent and the in-situ $CO_2$; and (3) repeating the injection of the acid, where the formed gel protects the high permeable zones and diverts the acid to the lower permeable zones. Further, the high-viscosity gel can be removed by taking advantage of its physiochemical properties via, e.g., thermal degradation or restoring the low-viscosity fluid by injecting a purge gas, e.g., nitrogen ($N_2$).

Figure 1:
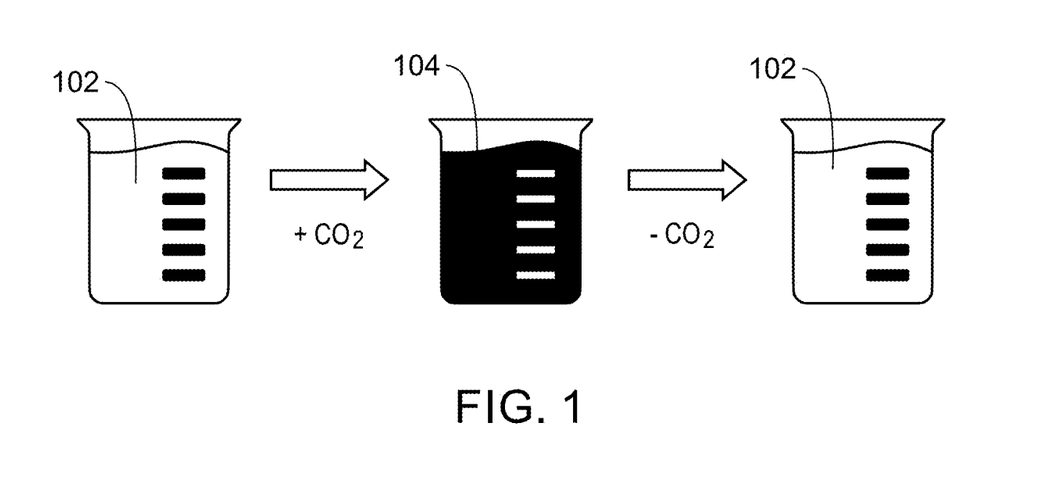
FIG. 1 is an illustration of the concept of $CO_2$ reversible switching applicable for a $CO_2$-responsive diverting agent.
Figure 5:
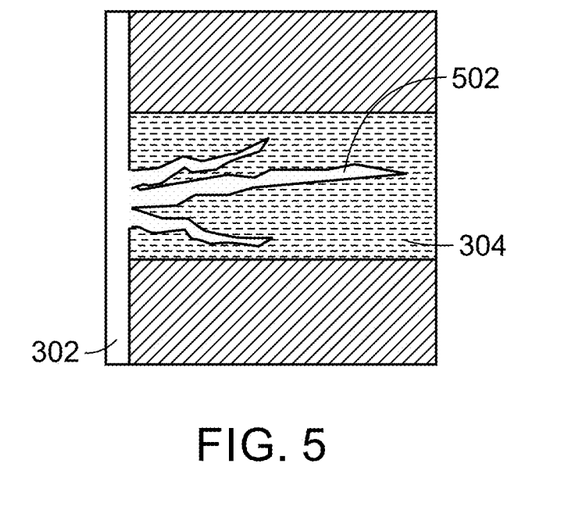
FIG. 5 is a subterranean carbonate formation after removing the $CO_2$-responsive diverting agent used in the acid stimulation.
Figure 6A:
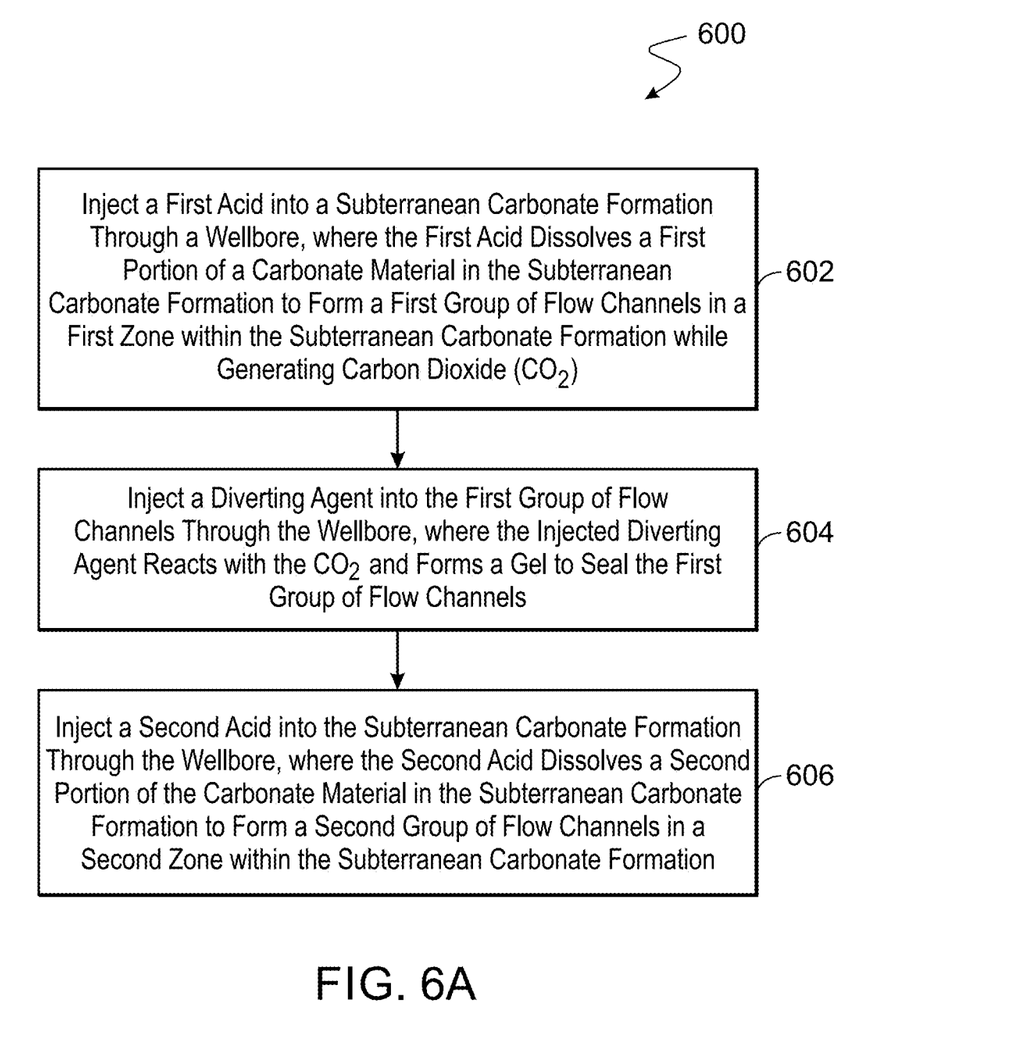
FIG. 6A illustrates an implementation.
Figure 6B:
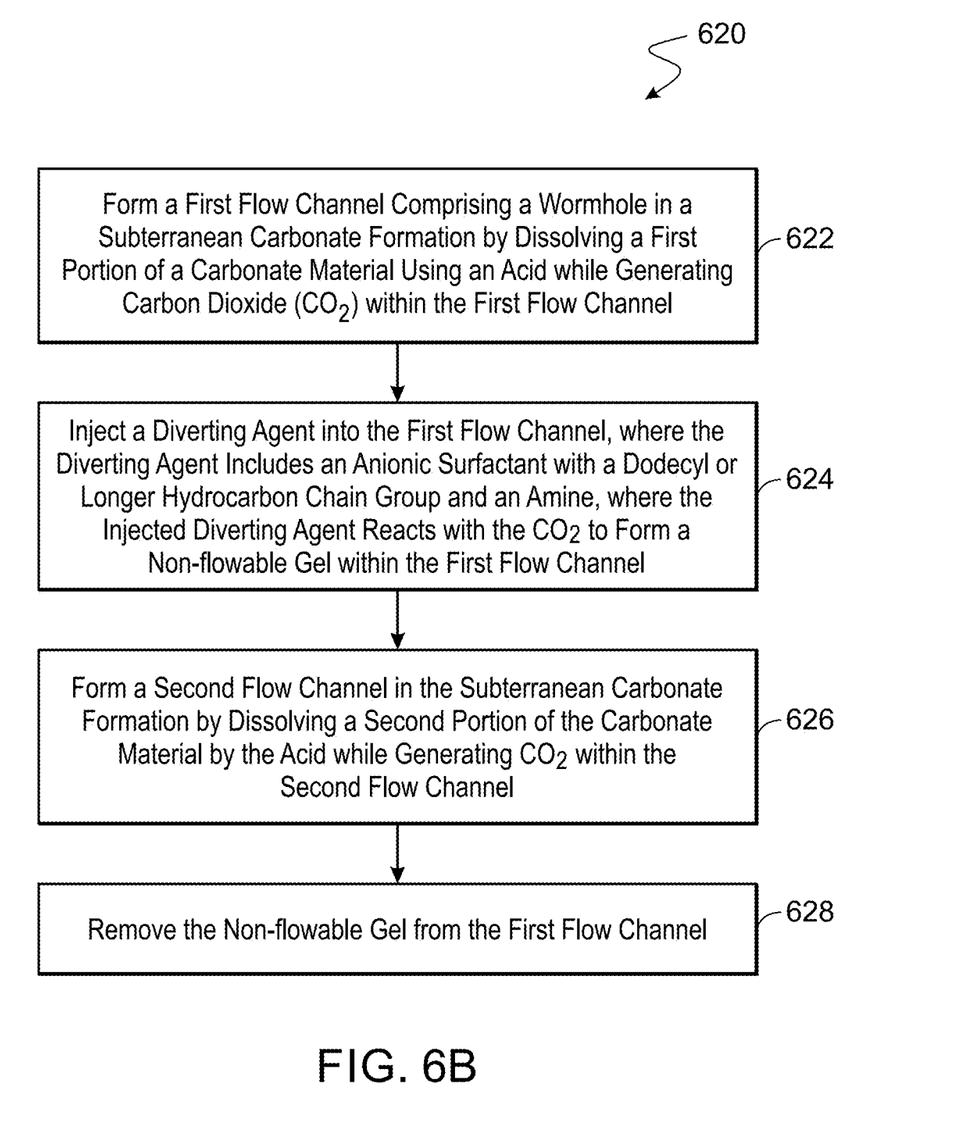
FIG. 6B illustrates another implementation.
Figure 6C:
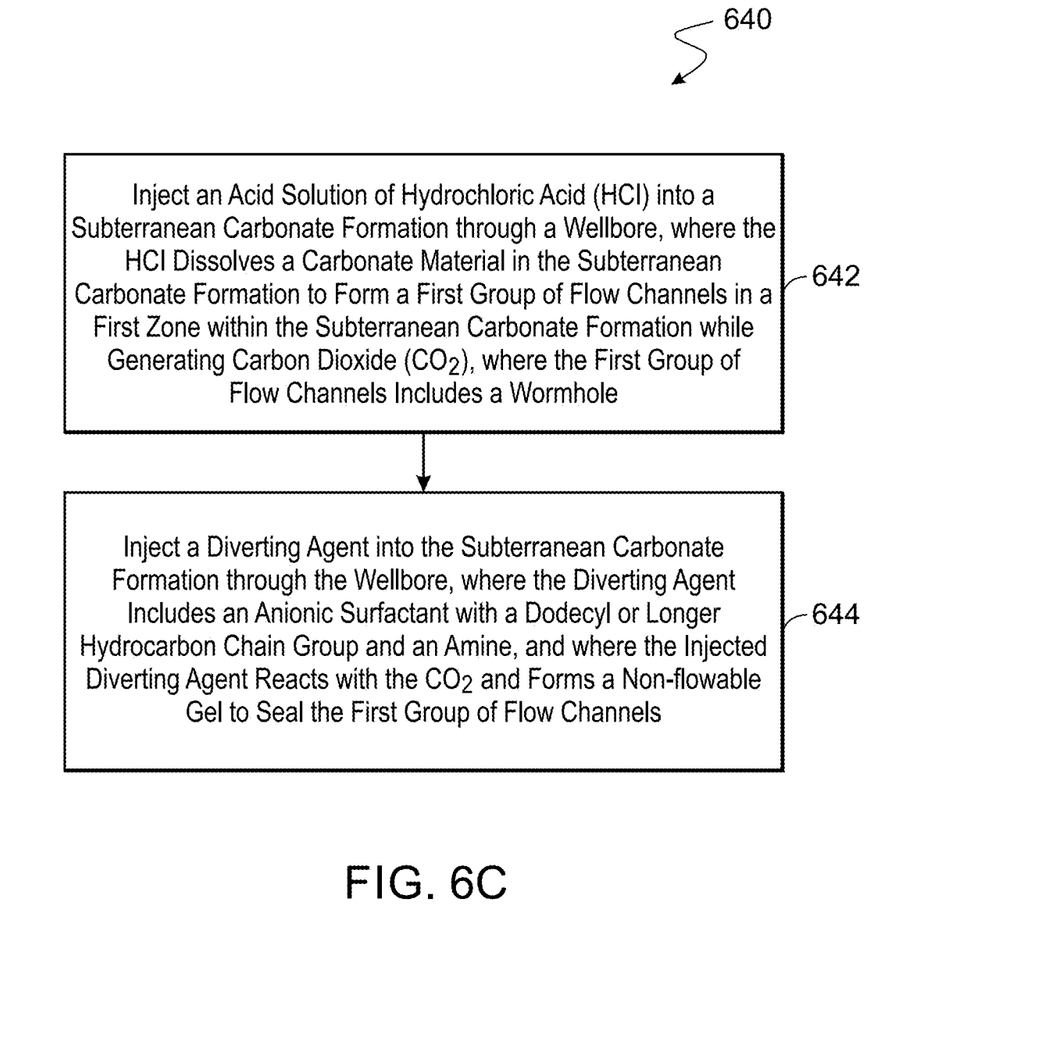
FIG. 6C illustrates yet another implementation.

In the following, the concept of $CO_2$ reversible switching of a surfactant solution is first described in FIG. 1. The general process of acid stimulation and possible channel patterns are then described referring to FIG. 2. The acid stimulation using a $CO_2$-responsive diverting agent in accordance with various implementations is then described referring to FIGS. 3A-3D and 4-5. FIGS. 6A-6C are example process flow diagrams for the method of acid stimulation.

Figure 7A:
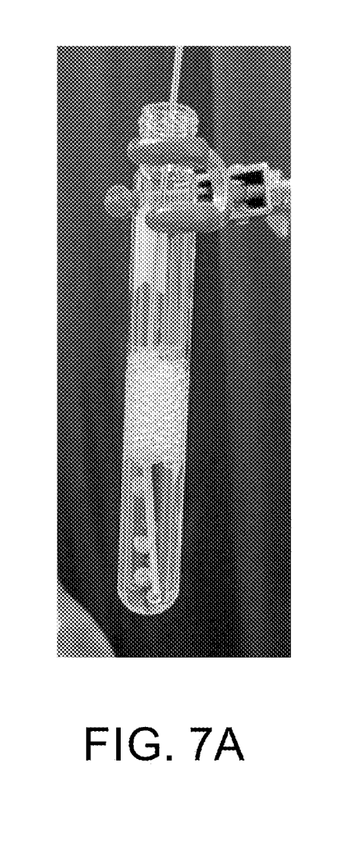
FIG. 7A is the solution before bubbling with $CO_2$.
Figure 7B:
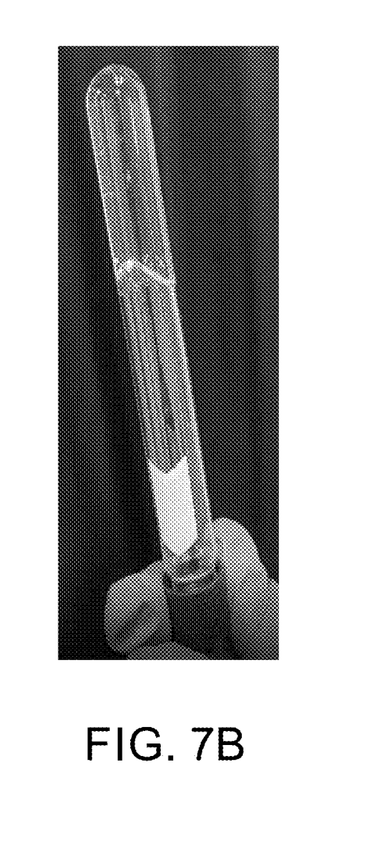
FIG. 7B is the solution after the bubbling.
Figure 8:
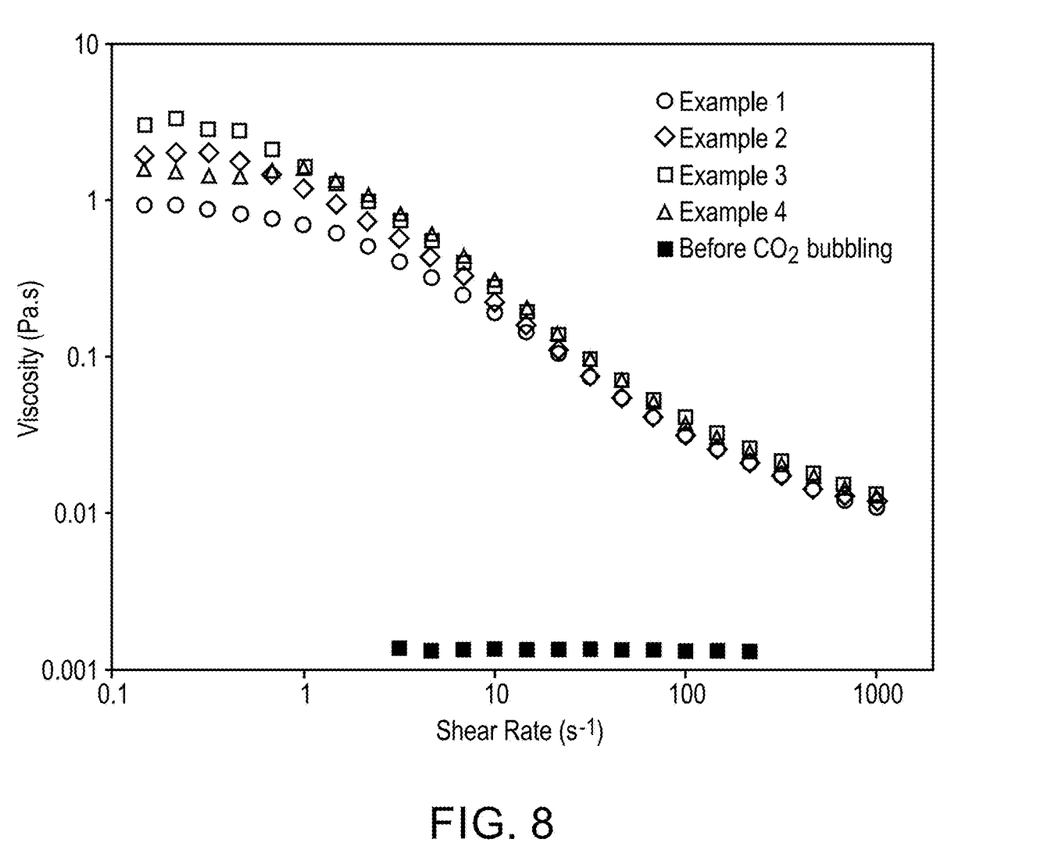
FIG. 8 is a graph of the viscosity as a function of shear rate of solutions of a $CO_2$-responsive diverting agent.

Examples of a $CO_2$-responsive diverting agent and its material properties are described referring to FIGS. 7A-7B and 8.

$Co_2$ Reversible Switching

The method of acid stimulation described in this disclosure is based on the application of the $CO_2$ reversible switching of certain surfactant solutions to a diverting agent to seal flow channels and protect them from further dissolution. FIG. 1 illustrates a general concept of the $CO_2$ reversible switching. A surfactant solution 102 is a liquid solution with a reasonably low viscosity to make it transferrable as a fluid, e.g., through a pipe at a room temperature. With proper selection of its composition, the surfactant solution 102 can substantially increase in viscosity and be hardened upon the reaction with $CO_2$, e.g., forming a $CO_2$-containing gel 104. The $CO_2$-containing gel 104 can have a viscosity substantially higher than the initial solution, for example, by at least an order of magnitude. Further, the $CO_2$-containing gel 104 can return to a liquid state by removing the $CO_2$ from the composition. The specific compositions of a surfactant solution applicable for the application of acid stimulation and its use in the process will be further described below referring to FIGS. 3A-3D, 4-5, and 6A-6C.

Acid Stimulation

In the process of acid stimulation, acids can be applied to the gas and oil reservoirs to increase the formation permeability and porosity near the wellbore. The acids can dissolve different minerals such as quartz and carbonates and feldspar present in reservoir rocks, thus increasing the permeability which ultimately increases the flow rate of hydrocarbon fluid from reservoir to the wellbore. The reaction between acid and the carbonate produces $CO_2$. Reaction schemes 1 and 2 below describe the reaction of HCl with two main components in a carbonate formation: calcite and dolomite, respectively.

$$CaCO_3 + 2H^+ \rightarrow Ca^{2+} + CO_2 \uparrow + H_2O \qquad (1)$$

$$CaMg(CO_3)_2 + 4H^+ \rightarrow Ca^{2+} + Mg^{2+} + 2CO_2 \uparrow + 2H_2O \qquad (2)$$

Figure 2:
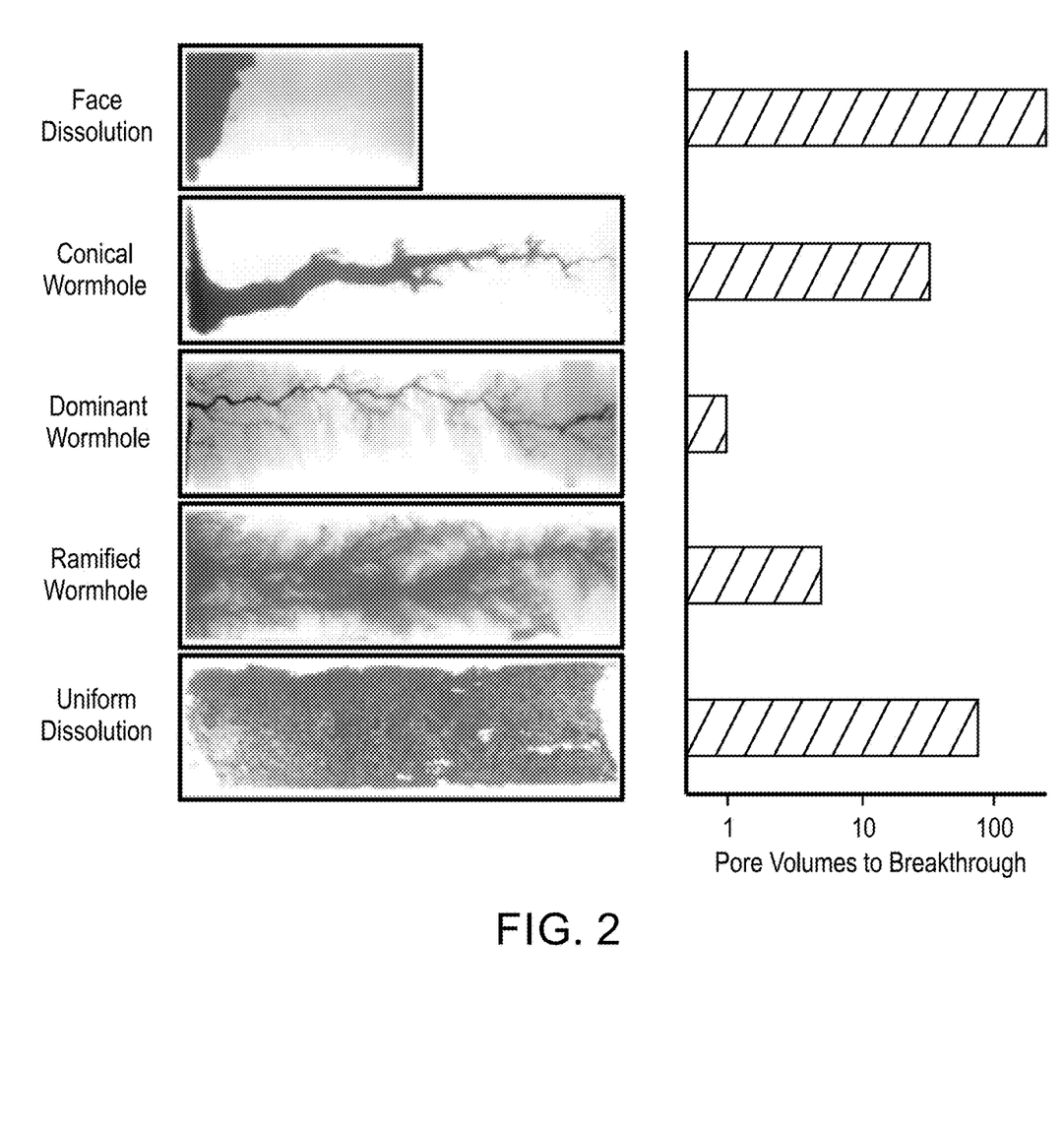
FIG. 2 is an illustration of acid dissolution patterns and corresponding minimum volume of fluid required for the dissolution.

When the formations are acidized by acid, a few dominating channels in the matrix are created and most of the acid will flow along these high permeable channels, leaving the rest of the rock untreated. However, this phenomenon is unfavorable. As illustrated in FIG. 2, the dominant wormhole pattern may be preferred because of the efficient stimulation enabled by the least fluid volume required.

Acid Stimulation of a Carbonate Formation with a $CO_2$-Responsive Diverting Agent In various implementations, the acid stimulation includes four injection steps: (1) a pre-flush to minimize emulsions and precipitations in the formation (e.g., FIG. 3A); (2) a first acid injection to inject an acid to react with carbonate formation to build various breakthrough patterns in the formation (e.g., FIG. 3B); (3) injection of $CO_2$-responsive diverting agent to direct a subsequent acid to the untreated/less permeable zones of the formation (e.g., FIGS. 3C-3D); and (4) a post-flush to remove any remaining residues of the injected fluids from the channels.

Figure 3A:
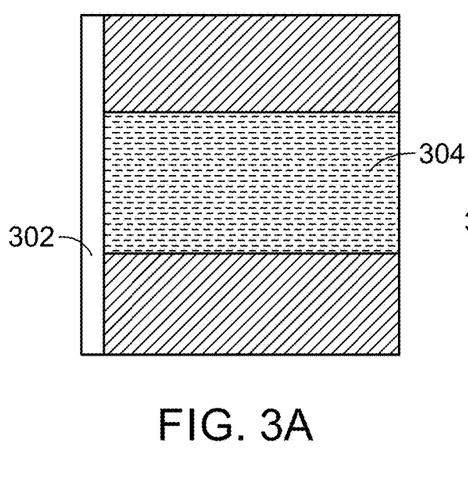
FIG. 3A is the formation before starting the acid stimulation.

In FIG. 3A, a wellbore 302 is drilled to access a subterranean carbonate formation 304. The subterranean carbonate formation 304 can include calcite, dolomite, and other minerals. In some implementations, prior to performing the first acid injection, a pre-flush is performed. For example, diluted acid, surfactant, organic solvent, or any combination of them can be used as a pre-flush fluid to clean the internal surfaces of the wellbore 302 by removing asphaltene deposits and other solids that can hinder efficient wellbore operations. In various implementations, the pre-flush fluid remains within the wellbore 302 and will not enter the subterranean carbonate formation 304 during the pre-flush. Further, the method of this disclosure can include steps prior to the acid stimulation such as drilling the wellbore 302 in the subterranean carbonate formation 304, for example, for oil and gas production.

Figure 3B:
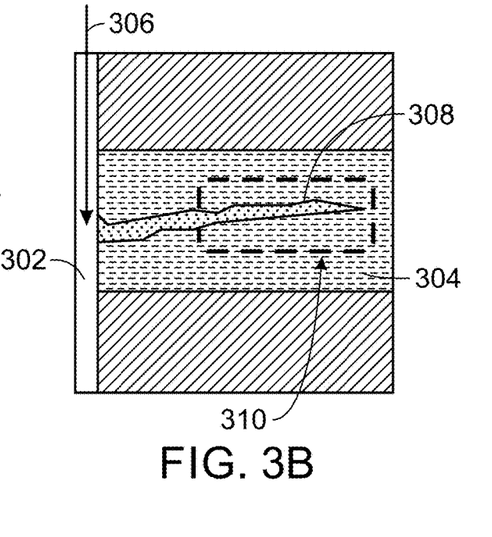
FIG. 3B is the formation after a first acid injection.

In FIG. 3B, a first acid 306 can be injected into the subterranean carbonate formation 304 through the wellbore 302. The first acid 306 can dissolve a portion of the formation to form a first flow channel 308. The first acid 306 can be an inorganic acid, an organic acid, or a mixture of any acids. Examples of the inorganic acid for the first acid 306 include hydrochloric acid (HCl), sulfuric acid ($H_2SO_4$), phosphoric acid ($H_3PO_4$), and sulfamic acid. Examples of the organic acids for the first acid 306 include formic acid, hydroxyacetic acid, acetic acid, citric acid, and methane sulphonic acid. In some implementations, the first acid 306 is used as an aqueous acid solution at an acid concentration between about 5 wt % and about 28 wt %.

As previously described, the dissolution of the carbonate material by the first acid 306 generates $CO_2$. Accordingly, the $CO_2$ is present in the first flow channel 308. This in-situ generated $CO_2$ can participate in the acid diversion in the subsequent step via the reaction with a diverting agent.

Although a single channel is illustrated in FIG. 3B for illustration purpose, in some implementations, the first acid injection forms a group of flow channels. Further, the first flow channel 308 can vary in shape, e.g., a wormhole, a conical wormhole, and a branched channel, which can be further fractured in the subsequent steps of the acid stimulation.

As illustrated in FIG. 3B, the first flow channel 308 can be formed as a dominant flow channel within a first target zone 310. In some implementations, the first target zone 310 is an area with high permeability within the subterranean carbonate formation 304 in relative to other areas. Without the effective acid diversion, the channels formed in the first target zone 310 may expand with continued acid dissolution and result in undesired channel patterns. For better productivity of the wellbore 302 to recover fluids such as hydrocarbons, numerous flow channels are desired, particularly the dominant wormhole pattern as illustrated in FIG. 1. To achieve such a pattern, more channels need to be formed in areas outside the first target zone 310.

In one implementation, the first acid injection is performed as a part of a clean-up operation to remove materials obstructing the flow of desired materials in the wellbore 302. Accordingly, the first acid 306 can be injected along with other treatment fluids such as other fracturing fluids.

Figure 3C:
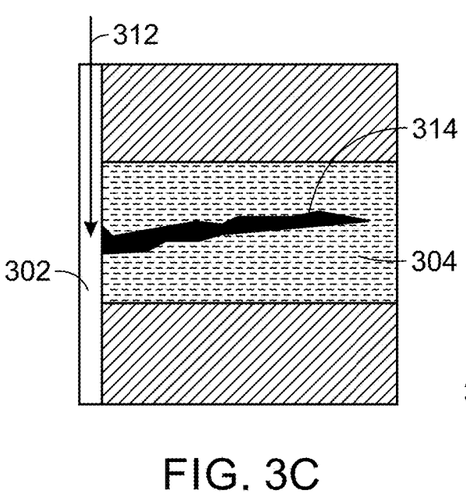
FIG. 3C is the formation after an acid diversion with the $CO_2$-responsive diverting agent.

In FIG. 3C, after forming the first flow channel 308, the acid stimulation proceeds to the injection of a $CO_2$-responsive diverting agent 312 through the wellbore 302. In various implementations, the $CO_2$-responsive diverting agent includes an anionic surfactant and an amine. The anionic surfactant can have a dodecyl group or a longer hydrocarbon chain ($>C_{12}$) group. The anionic surfactant can include but is not limited to sodium dodecyl sulfate (SDS), sodium tetradecyl sulfate (STS), sodium hexadecyl sulfate (SHS), sodium octadecyl sulfate (SOS), and any mixture of them. The amine additive can include but is not limited to one of diethylenetriamine (DETA), bis(hexamethylene)triamine (BHMTA), 2-(dimethylamino) ethanol (DMAE), and any mixture of them. In one implementation, the $CO_2$-responsive diverting agent includes a pair of SDS and DETA. In another implementation, the $CO_2$-responsive diverting agent includes a pair of SOS and DMAE. In yet another implementation, the $CO_2$-responsive diverting agent includes a pair of two or more anionic surfactants and one or more amine additive. The $CO_2$-responsive diverting agent can also include a pair of one anionic surfactant and two or more amine additives.

The $CO_2$-responsive diverting agent can be prepared and used as a solution, e.g., aqueous solution. In some implementations, the molar concentrations of the two components are 0.25 mol/L or greater for the anionic surfactant and 0.25 mol/L or greater for the amine additive. For example, the molar concentrations can be between about 0.25 mol/L and about 1.0 mol/L for each of the components. In some implementations, the molar ratio of the anionic surfactant and the amine additive is between about 5:1 and 1:5, e.g., 6:5 and 5:6. In one implementation, the $CO_2$-responsive diverting agent contains about 145 g/L of SDS and about 62 g/L of DETA in water.

In various implementations, the $CO_2$-responsive diverting agent solution is provided as a low-viscosity fluid having a viscosity less than $2\times10^{-3}$ Pa·s, for example, between about $1\times10^{-3}$ Pa·s and about $2\times10^{-3}$ Pa·s. In one implementation, the viscosity of the solution is $1.51\pm0.15\times10^{-3}$ Pa·s. The "$CO_2$-responsive" characteristic of the diverting agent can be enabled by the specific composition, where the ionic strength can be substantially but reversibly rise in the presence of $CO_2$, for example, by forming a carbonate salt. The increase in the ionic strength can increase the viscosity and induce gelation of the fluid.

In one or more implementations, the $CO_2$-responsive diverting agent is injected into the wellbore 302 as a mixture with other treatment fluids, e.g., stimulation fluid, fracturing fluid, acidizing fluid, drilling fluid, clean-up fluid, spotting fluid, completion fluid, remedial treatment fluid, abandonment fluid, cementing fluid, or packer fluid.

Upon the delivery of the $CO_2$-responsive diverting agent 312 into the first flow channel 308, the in-situ generated $CO_2$ within the first flow channel 308 can react with the $CO_2$-responsive diverting agent to form a non-flowable gel 314 that fills the first flow channel 308. In various implementations, the transformation of the $CO_2$-responsive diverting agent into the non-flowable gel 314 is triggered by the contact with the in-situ generated $CO_2$. In some implementations, the transformation can also be triggered by the reaction with the residual acid present in the first flow channel 308 or with both the $CO_2$ and the residual acid.

In some implementations, the viscosity of the non-flowable gel 314 has a viscosity greater than $1\times10^{-2}$ Pa·s, for example, between about $1\times10^{-2}$ Pa·s and about 10 Pa·s. In one implementation, the viscosity of the non-flowable gel 314 is between about 1 Pa·s and about 10 Pa·s. With the non-flowable gel 314 filling the void space created by the first flow channel 308, the first channel can be preserved during a subsequent acid injection step. In other words, the acid will be diverted into new aeras within the subterranean carbonate formation 304.

Figure 3D:
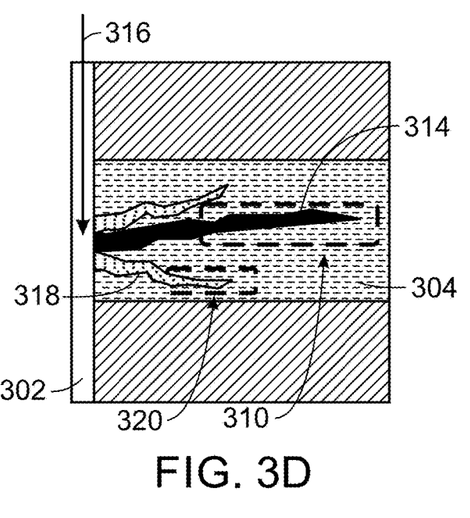
FIG. 3D is the formation after a second acid injection.

In FIG. 3D, a second acid 316 can be injected into the subterranean carbonate formation 304 through the wellbore 302. The second acid 316 can dissolve another portion of the formation to form a second flow channel 318. In various implementations, the second flow channel 318 is formed within a second target zone 320 different from the first target zone 310. The second target zone 320 can be an area with permeability lower than that of the first target zone 310, and therefore, in some implementations, the channel formation in the second target zone 320 is only possible with the successful acid diversion. The second acid 316 can be the same as the first acid 306 or a different acid. Further, the second acid injection can use the same process conditions, e.g., injection rate and pressure, as the first acid injection or it can use different conditions.

Although only two new channels are illustrated in FIG. 3D for illustration purpose, the second acid injection forms more flow channels without damaging the first flow channel 308 filled with the non-flowable gel 314.

Second Acid Diversion

As described above referring to FIGS. 3A-3D, the injection of the $CO_2$-responsive diverting agent 312 between the first and second acid injections enables the acid diversion and improve the channel patterns for oil and gas production. Further, the method of acid stimulation can include alternating the steps of injecting the acid and the $CO_2$-responsive diverting agent for any number of times. For example, after the second acid injection, a second diverting agent injection can be performed as illustrated in FIG. 4.

Figure 4:
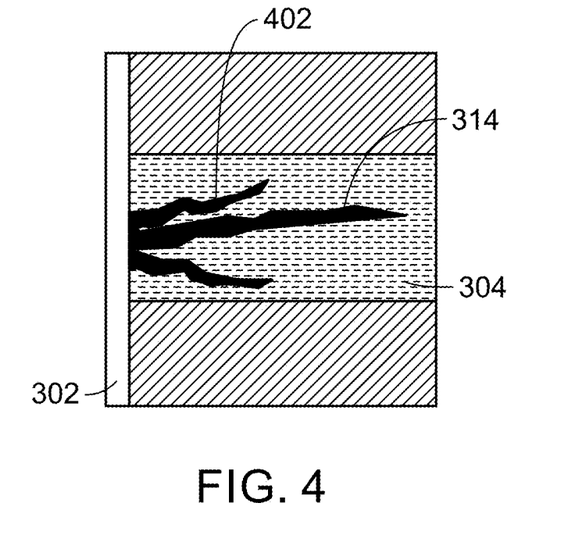
FIG. 4 is a subterranean carbonate formation during the acid stimulation with a $CO_2$-responsive diverting agent at a stage after a second injection of the $CO_2$-responsive diverting agent.

In FIG. 4, a subterranean carbonate formation 304 is during the acid stimulation, after the steps of the first acid injection, the first diverting agent injection, the second acid injection, and the second diverting agent injection. Like numbered items are described above referring to FIGS. 3A-3D and will not be repeated in detail. After the second diverting agent injection, a second non-flowable gel 402 is formed within the second flow channels (e.g., the second flow channel 318 in FIG. 3D). Similar to the first acid diversion, the gelation can be induced by the $CO_2$ formed within the second flow channels during the second acid injection. With the seal provided by the gels formed within the first and second flow channels, an additional acid introduced by a subsequent acid injection can be directed into a new zone to form additional flow channels.

Gel Removal to Open the Flow Channels

Once the formation of flow channels is complete, the gels that fill the flow channels can be removed to allow the passage of fluids. In FIG. 5, a subterranean carbonate formation 304 is at a stage after removing the $CO_2$-responsive diverting agent used in the acid stimulation, where the removal results in opened flow channels 502.

In some implementations, the gel removal can be achieved by thermally decomposing the gel of the $CO_2$-responsive diverting agent. In other implementations, the $CO_2$-reversible characteristic of the $CO_2$-responsive diverting agent can be used. The high-viscosity fluid or gel formed in the presence of $CO_2$ can return to the initial low-viscosity fluid that is flowable by removing the $CO_2$ from the composition. Accordingly, the gel removal step can include flowing a purge gas into the subterranean carbonate formation 304 via the wellbore 302. The purge gas can replace the $CO_2$ captured in the gel and restore the fluid of the $CO_2$-responsive diverting agent. For example, an inert gas such as $N_2$ or a noble gas can be used for the purge gas. The restored fluid can then be washed away from the flow channels.

The opened flow channels 502 are available to flow recoverable fluid, e.g., water or hydrocarbons, from the subterranean carbonate formation 304 or a reservoir that is connected to it. The use of the $CO_2$-responsive diverting agent described in this disclosure can provide the improved pattern of the flow channels with additional flow capacity and help increasing the production of the recoverable fluid in subsequent production operations after the acid stimulation.

Although various implementations are described as acid stimulation, the use of a $CO_2$-responsive diverting agent can also be combined with other techniques to create flow channels that can be performed in addition to or in place of the acid stimulation. For example, flow channels can, at least in part, be formed by perforation using a jet gun with explosive charges, bullet perforating, abrasive jetting, or high-pressure fluid jetting.

FIGS. 6A-6C are example process flow diagrams of a method of acid stimulation using a $CO_2$-responsive diverting agent as described above. In FIG. 6A, a method 600 according to an implementation starts with injecting 602 a first acid into a subterranean carbonate formation through a wellbore, where the first acid dissolves a first portion of a carbonate material in the subterranean carbonate formation to form a first group of flow channels in a first zone within the subterranean carbonate formation while generating carbon dioxide ($CO_2$). Subsequently, the method 600 proceeds to injecting 604 a diverting agent into the first group of flow channels through the wellbore, where the injected diverting agent reacting with the $CO_2$ and forming a gel to seal the first group of flow channels. A second acid is then injected 606 into the subterranean carbonate formation through the wellbore, where the second acid dissolves a second portion of the carbonate material in the subterranean carbonate formation to form a second group of flow channels in a second zone within the subterranean carbonate formation, where the second zone has a permeability lower than that of the first zone, and the gel blocks the second acid from entering the first group of flow channels.

In FIG. 6B, another method 620 according to another implementation starts with forming 622 a first flow channel including a wormhole in a subterranean carbonate formation by dissolving a carbonate material using an acid while generating carbon dioxide ($CO_2$) within the first flow channel, followed by injecting 624 a diverting agent into the first flow channel, where the diverting agent includes an anionic surfactant with a dodecyl or longer hydrocarbon chain group and an amine. At this stage, a non-flowable gel is formed within the first flow channel through the reaction of the injected diverting agent with the $CO_2$, where the non-flowable gel seals the first flow channel. A second flow channel is then formed 626 in the subterranean carbonate formation by dissolving a second portion of the carbonate material using the acid while generating $CO_2$ within the second flow channel. The method 620 then proceeds to removing 628 the non-flowable gel from the first flow channel.

In FIG. 6C, yet another method 640 according to yet another implementation starts with injecting 642 an acid solution of hydrochloric acid (HCl) into a subterranean carbonate formation through a wellbore, where the HCl dissolves a carbonate material in the subterranean carbonate formation to form a first group of flow channels in a first zone within the subterranean carbonate formation while generating carbon dioxide ($CO_2$), where the first group of flow channels includes a wormhole. Subsequently, a diverting agent is injected 644 into the subterranean carbonate formation through the wellbore, where the diverting agent includes an anionic surfactant with a dodecyl or longer hydrocarbon chain group and an amine, and where the injected diverting agent reacts with the $CO_2$ and forms a non-flowable gel to seal the first group of flow channels.

As used in this disclosure, the term "subterranean formation" refers to any material under the surface of the earth, including under the surface of the bottom of the ocean. For example, a subterranean formation or material can be any section of a wellbore and any section of a subterranean petroleum- or water-producing subterranean formation or region in fluid contact with the wellbore. Placing a material in a subterranean formation can include contacting the material with any section of a wellbore or with any subterranean region in fluid contact with the wellbore. Subterranean materials can include any materials placed into the wellbore such as cement, drill shafts, liners, tubing, casing, or screens; placing a material in a subterranean formation can include contacting with such subterranean materials. In some examples, a subterranean formation or material can be any below-ground region that can produce liquid or gaseous petroleum (hydrocarbon) materials, water, or any section below-ground in fluid contact with the liquid or gaseous petroleum material. For example, a subterranean formation or material can be at least one of an area desired to be fractured, a fracture or an area surrounding a fracture, and a flow pathway (channel) or an area surrounding a flow pathway or channel. The fracture or a flow pathway can be optionally fluidically connected to a subterranean petroleum- or water-producing region, directly or through one or more fractures or flow pathways.

As used in this disclosure, "treatment of a subterranean formation" can include any activity or process directed to extraction of a recoverable fluid, such as water or petroleum materials, from a subterranean recoverable fluid-producing subterranean formation or region, for example, including drilling, stimulation (including hydraulic fracturing and matrix treatment), clean-up, acidizing, completion, cementing, remedial treatment, water control, abandonment, and the like.

As used in this disclosure, the term "flow channel" refers to any suitable subterranean flow pathway through which two subterranean locations are in fluid connection. One example is a flow channel between a hydrocarbon reservoir and a wellbore. The flow pathway can be sufficient for petroleum or water to flow from one subterranean location to the wellbore or vice-versa. A flow pathway can include at least one of a hydraulic fracture, a wormhole, and a fluid connection across a screen, across gravel pack, across proppant, including across resin-bonded proppant or proppant deposited in a fracture, and across sand. A flow pathway can include a natural subterranean passageway between subterranean formation matrices through which fluids can flow.

Examples

An example $CO_2$-responsive diverting agent is an aqueous solution containing 0.5 mol/L of SDS and 0.6 mol/L of DETA. The solution can be prepared by dissolving the predetermined amount of SDS and DETA in water. The $CO_2$-responsive characteristic was experimentally demonstrated using this example composition. First, the solution was bubbled with $CO_2$ at room temperature for about 10 min. As illustrated in FIGS. 7A-7B, the bubbling converted the solution into a non-flowable gel, which did not flow in a test tube when it is held upside down.

Further, four samples were prepared with varying concentrations of the SDS and DETA. Examples #1-4 correspond to the SDS/DETA solutions at total concentrations of 300, 400, 500, and 600 mol/L, respectively, with the SDS:DETA molar ratio of 5:6. Their rheological properties of the yielded $CO_2$-based gels were determined at 25° C. using a TA controlled-stress rheometer (TA Instruments—Waters LLC) equipped with a setup of parallel plates. The shear rate was ranged from 0.1 to 1000 $s^{-1}$. As a reference, the rheology of the initial solution of Example #4 before $CO_2$ bubbling was measured using a setup of double wall concentric cylinders. FIG. 8 illustrates the resulting solution viscosity as a function of shear rate. While the initial solution was a very low-viscosity fluid with the viscosity of about $1.5 \times 10^{-3}$ Pas, the $CO_2$ bubbling substantially increased the viscosity at least for about one order of magnitude. The resulting viscosity varied greatly depending on the shear rate, where the highest viscosity was obtained with the lowest shear rate. The viscosity after the $CO_2$ bubbling ranged from about $1 \times 10^{-2}$ Pa·s and about 3 Pa·s. These results demonstrate the ability of the described compositions to respond to $CO_2$ and function as a $CO_2$-responsive diverting agent.

Implementations

An implementation described herein provides a method of acid stimulation, where the method includes: injecting a first acid into a subterranean carbonate formation through a wellbore, the first acid dissolving a first portion of a carbonate material in the subterranean carbonate formation to form a first group of flow channels in a first zone within the subterranean carbonate formation while generating carbon dioxide ($CO_2$); injecting a diverting agent into the first group of flow channels through the wellbore, the injected diverting agent reacting with the $CO_2$ and forming a gel to seal the first group of flow channels; and injecting a second acid into the subterranean carbonate formation through the wellbore, the second acid dissolving a second portion of the carbonate material in the subterranean carbonate formation to form a second group of flow channels in a second zone within the subterranean carbonate formation, the second zone having a permeability lower than that of the first zone, the gel blocking the second acid from entering the first group of flow channels.

In an aspect, combinable with any other aspect, the method further includes, after injecting the second acid, removing the gel from the first group of flow channels.

In an aspect, combinable with any other aspect, the removing includes thermally decomposing the gel.

In an aspect, combinable with any other aspect, the removing includes injecting a purge gas into the subterranean carbonate formation through the wellbore, the purge gas removing the $CO_2$ from the gel and converting the gel into a fluid.

In an aspect, combinable with any other aspect, $CO_2$ is formed in the second group of flow channels from the injection of the second acid, further including injecting the diverting agent into the second group of flow channels, the injected diverting agent reacting with the $CO_2$ within the second group of flow channels and forming a gel to seal the second group of flow channels.

In an aspect, combinable with any other aspect, the first acid includes hydrochloric acid (HCl), sulfuric acid ($H_2SO_4$), phosphoric acid ($H_3PO_4$), or sulfamic acid.

In an aspect, combinable with any other aspect, the first acid includes formic acid, hydroxyacetic acid, acetic acid, citric acid, or methane sulphonic acid.

In an aspect, combinable with any other aspect, the diverting agent includes an anionic surfactant and an amine, the anionic surfactant including a dodecyl or longer hydrocarbon group.

In an aspect, combinable with any other aspect, the anionic surfactant includes sodium dodecyl sulfate (SDS), sodium tetradecyl sulfate (STS), sodium hexadecyl sulfate (SHS), or sodium octadecyl sulfate (SOS).

In an aspect, combinable with any other aspect, the amine includes diethylenetriamine (DETA), bis(hexamethylene) triamine (BHMTA), 2-(dimethylamino) ethanol (DMAE).

Another implementation described herein provides a method of acid stimulation, where the method includes: forming a first flow in a subterranean carbonate formation by dissolving a carbonate material using an acid while generating carbon dioxide ($CO_2$) within the first flow channel; injecting a diverting agent into the first flow channel, the diverting agent including an anionic surfactant with a dodecyl or longer hydrocarbon chain group and an amine, the injected diverting agent reacting with the $CO_2$ to form a non-flowable gel within the first flow channel that seals the first flow channel; forming a second flow channel in the subterranean carbonate formation by dissolving a second portion of the carbonate material using the acid while generating $CO_2$ within the second flow channel; and removing the non-flowable gel from the first flow channel.

In an aspect, combinable with any other aspect, the removing includes thermally decomposing the gel.

In an aspect, combinable with any other aspect, the removing includes injecting a purge gas into the subterranean carbonate formation through the wellbore, the purge gas removing the $CO_2$ from the gel and converting the gel into a fluid.

In an aspect, combinable with any other aspect, the acid includes hydrochloric acid (HCl), sulfuric acid ($H_2SO_4$), phosphoric acid ($H_3PO_4$), sulfamic acid, formic acid, hydroxyacetic acid, acetic acid, citric acid, or methane sulphonic acid.

In an aspect, combinable with any other aspect, the acid is a solution with an acid concentration of between 5 wt % and 28 wt %.

In an aspect, combinable with any other aspect, where the anionic surfactant includes sodium dodecyl sulfate (SDS), sodium tetradecyl sulfate (STS), sodium hexadecyl sulfate (SHS), or sodium octadecyl sulfate (SOS), and where the amine includes diethylenetriamine (DETA), bis(hexamethylene)triamine (BHMTA), 2-(dimethylamino) ethanol (DMAE).

In an aspect, combinable with any other aspect, the diverting agent is an aqueous solution including the anionic surfactant at a concentration of at least 0.25 mol/L and the amine at a concentration of at least 0.25 mol/L.

Another implementation described herein provides a method of acid stimulation, where the method includes: injecting an acid solution of hydrochloric acid (HCl) into a subterranean carbonate formation through a wellbore, the HCl dissolving a carbonate material in the subterranean carbonate formation to form a first group of flow channels in a first zone within the subterranean carbonate formation while generating carbon dioxide ($CO_2$), the first group of flow channels; and injecting a diverting agent into the subterranean carbonate formation through the wellbore, the diverting agent including an anionic surfactant with a dodecyl or longer hydrocarbon chain group and an amine, the injected diverting agent reacting with the $CO_2$ and forming a non-flowable gel to seal the first group of flow channels.

In an aspect, combinable with any other aspect, the method further includes alternately repeating the steps of injecting the acid solution and injecting the diverting agent, where each step of injecting the acid solution forms a new flow channel.

In an aspect, the method further includes extracting hydrocarbons from a reservoir using the flow channels formed within the subterranean carbonate formation.

While this disclosure has been described with reference to illustrative implementations, this description is not intended to be construed in a limiting sense. Various modifications and combinations of the illustrative implementations, as well as other implementations of the disclosure, will be apparent to persons skilled in the art upon reference to the description. It is therefore intended that the appended claims encompass any such modifications or implementations.

What is claimed is:

1. A method of acid stimulation, the method comprising:
injecting a first acid into a subterranean carbonate formation through a wellbore, the first acid dissolving a first portion of a carbonate material in the subterranean carbonate formation to form a first group of flow channels in a first zone within the subterranean carbonate formation while generating carbon dioxide ($CO_2$);
injecting a diverting agent into the first group of flow channels through the wellbore, wherein the diverting agent comprises an anionic surfactant and an amine, the anionic surfactant comprising a dodecyl or longer hydrocarbon group, the injected diverting agent reacting with the $CO_2$ and forming a gel to seal the first group of flow channels; and
injecting a second acid into the subterranean carbonate formation through the wellbore, the second acid dissolving a second portion of the carbonate material in the subterranean carbonate formation to form a second group of flow channels in a second zone within the subterranean carbonate formation, the second zone having a permeability lower than that of the first zone, the gel blocking the second acid from entering the first group of flow channels.

2. The method of claim 1, further comprising, after injecting the second acid, removing the gel from the first group of flow channels.

3. The method of claim 2, wherein the removing comprises thermally decomposing the gel.

4. The method of claim 2, wherein the removing comprises injecting a purge gas into the subterranean carbonate formation through the wellbore, the purge gas removing the $CO_2$ from the gel and converting the gel into a fluid.

5. The method of claim 1, wherein $CO_2$ is formed in the second group of flow channels from the injection of the second acid, further comprising injecting the diverting agent into the second group of flow channels, the injected diverting agent reacting with the $CO_2$ within the second group of flow channels and forming a gel to seal the second group of flow channels.

6. The method of claim 1, wherein the first acid comprises hydrochloric acid (HCl), sulfuric acid ($H_2SO_4$), phosphoric acid ($H_3PO_4$), or sulfamic acid.

7. The method of claim 1, wherein the first acid comprises formic acid, hydroxyacetic acid, acetic acid, citric acid, or methane sulphonic acid.

8. The method of claim 1, wherein the anionic surfactant comprises sodium dodecyl sulfate (SDS), sodium tetradecyl sulfate (STS), sodium hexadecyl sulfate (SHS), or sodium octadecyl sulfate (SOS).

9. The method of claim 1, wherein the amine comprises diethylenetriamine (DETA), bis(hexamethylene)triamine (BHMTA), or 2-(dimethylamino) ethanol (DMAE).

10. A method of acid stimulation, the method comprising:
forming a first flow channel in a subterranean carbonate formation by dissolving a carbonate material using an acid while generating carbon dioxide ($CO_2$) within the first flow channel;
injecting a diverting agent into the first flow channel, the diverting agent comprising an anionic surfactant with a dodecyl or longer hydrocarbon chain group and an amine, the injected diverting agent reacting with the $CO_2$ to form a non-flowable gel within the first flow channel that seals the first flow channel;
forming a second flow channel in the subterranean carbonate formation by dissolving a second portion of the carbonate material using the acid while generating $CO_2$ within the second flow channel; and
removing the non-flowable gel from the first flow channel.

11. The method of claim 10, wherein the removing comprises thermally decomposing the gel.

12. The method of claim 10, wherein the removing comprises injecting a purge gas into the subterranean carbonate formation through the wellbore, the purge gas removing the $CO_2$ from the gel and converting the gel into a fluid.

13. The method of claim 10, wherein the acid comprises hydrochloric acid (HCl), sulfuric acid ($H_2SO_4$), phosphoric acid ($H_3PO_4$), sulfamic acid, formic acid, hydroxyacetic acid, acetic acid, citric acid, or methane sulphonic acid.

14. The method of claim 10, wherein the acid is a solution with an acid concentration of between 5 wt % and 28 wt %.

15. The method of claim 10, wherein the anionic surfactant comprises sodium dodecyl sulfate (SDS), sodium tetradecyl sulfate (STS), sodium hexadecyl sulfate (SHS), or sodium octadecyl sulfate (SOS), and wherein the amine comprises diethylenetriamine (DETA), bis(hexamethylene) triamine (BHMTA), or 2-(dimethylamino) ethanol (DMAE).

16. The method of claim 10, wherein the diverting agent is an aqueous solution comprising the anionic surfactant at a concentration of at least 0.25 mol/L and the amine at a concentration of at least 0.25 mol/L.

17. A method of acid stimulation, the method comprising:
injecting an acid solution of hydrochloric acid (HCl) into a subterranean carbonate formation through a wellbore, the HCl dissolving a carbonate material in the subterranean carbonate formation to form a first group of flow channels in a first zone within the subterranean carbonate formation while generating carbon dioxide ($CO_2$), the first group of flow channels; and
injecting a diverting agent into the subterranean carbonate formation through the wellbore, the diverting agent comprising an anionic surfactant with a dodecyl or longer hydrocarbon chain group and an amine, the injected diverting agent reacting with the $CO_2$ and forming a non-flowable gel to seal the first group of flow channels.

18. The method of claim 17, further comprising alternately repeating the steps of injecting the acid solution and injecting the diverting agent, wherein each step of injecting the acid solution forms a new flow channel.

19. The method of claim 18, further comprising extracting hydrocarbons from a reservoir using the flow channels formed within the subterranean carbonate formation.

* * * * *